United States Patent
Attanasio et al.

(10) Patent No.: US 9,485,134 B2
(45) Date of Patent: Nov. 1, 2016

(54) MANAGING CONFIGURATIONS OF SYSTEM MANAGEMENT AGENTS IN A DISTRIBUTED ENVIRONMENT

(75) Inventors: Luisa Attanasio, Moliterno (IT); Gianluca Gigliarelli, Rome (IT); Francesco Lecciso, Rome (IT); Gianluca Mariani, Rome (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 13/510,698

(22) PCT Filed: Oct. 20, 2010

(86) PCT No.: PCT/EP2010/065773
§ 371 (c)(1),
(2), (4) Date: May 18, 2012

(87) PCT Pub. No.: WO2011/069730
PCT Pub. Date: Jun. 16, 2011

(65) Prior Publication Data
US 2012/0233299 A1 Sep. 13, 2012

(30) Foreign Application Priority Data

Dec. 10, 2009 (EP) ..................................... 09178609

(51) Int. Cl.
*H04L 12/24* (2006.01)
*G06F 9/445* (2006.01)

(52) U.S. Cl.
CPC ............... *H04L 41/046* (2013.01); *G06F 8/60* (2013.01); *H04L 41/0843* (2013.01)

(58) Field of Classification Search
None
See application file for complete search history.

(56) References Cited

U.S. PATENT DOCUMENTS

| 6,976,145 | B1 | 12/2005 | Bradford | |
|---|---|---|---|---|
| 7,162,538 | B1 * | 1/2007 | Cordova | ........................ 709/238 |

(Continued)

FOREIGN PATENT DOCUMENTS

| CN | 1790266 A | 6/2006 |
|---|---|---|
| EP | 1357470 A2 | 10/2003 |

(Continued)

OTHER PUBLICATIONS

International Search Report for International Application No. PCT/EP2010/065773 dated Dec. 21, 2010.

*Primary Examiner* — Scott B Christensen
*Assistant Examiner* — Sean Concannon
(74) *Attorney, Agent, or Firm* — Winstead, P.C.

(57) ABSTRACT

A method, system and computer program product for managing system management agent configurations which include agent system management programs and program parameters in a distributed environment. A configuration management server sends upon request from the agents installed on the distributed system a description of their configuration. To this effect, the configuration management server maintains a database storing the agent configuration information, this database being usually updated by a system management administrator. The agents get from the server the list of peer distributed systems having the same agent configuration and their configuration from one distributed system of the list or obtain an agent configuration directly from the configuration management server if the peer distributed systems have modified their configuration. The agents advise the system management server when a new configuration has been installed.

21 Claims, 5 Drawing Sheets

(56) References Cited

U.S. PATENT DOCUMENTS

| | | |
|---|---|---|
| 2003/0031176 A1* | 2/2003 | Sim .............................. 370/392 |
| 2004/0261071 A1 | 12/2004 | Chuang et al. |
| 2007/0143446 A1 | 6/2007 | Morris |
| 2008/0130639 A1* | 6/2008 | Costa-Requena et al. ... 370/389 |
| 2008/0263545 A1* | 10/2008 | Cai et al. ...................... 718/100 |
| 2008/0301671 A1 | 12/2008 | Kim |
| 2009/0013318 A1* | 1/2009 | Aderton et al. .............. 717/171 |
| 2009/0130971 A1 | 5/2009 | Piekarski |
| 2010/0174807 A1* | 7/2010 | Lyman et al. ................. 709/221 |
| 2010/0299719 A1* | 11/2010 | Burks et al. ....................... 726/3 |
| 2011/0258299 A1* | 10/2011 | Herlein ............... H04L 67/1095 709/221 |

FOREIGN PATENT DOCUMENTS

| | | |
|---|---|---|
| EP | 1672490 A2 * | 6/2006 |
| EP | 1936497 A2 | 6/2008 |
| WO | 03058877 A1 | 7/2003 |

* cited by examiner

```
<Application>ApplicationName</Application>
<ConfigElement>

<INIFile>$systemdir/app.ini</INIFile>

<RecordElement>
                <ConfigHash>HASH</ConfigHash>
                <FileSize>10K</FileSize>
                <LastUpdate>Fri 12/04/2009 14:30:34.17</LastUpdate>
                <ContentIntrospection>
                        <IncludeParam>*</IncludeParam>
                        <ExcludeParam>SSLPort</ExcludeParam>
                <ContentIntrospection>
        <RecordElement>

<ConfigElement>
```
⎫
⎬ 300
⎭

```
<ConfigElement>
        <ConfigParam name="Port" value="80"/>
        <ConfigParam name="Host" value="hostname.ibm.com"/>
        <ConfigParam name="SSLPort" value="443"/>

<RecordElement>
                <ConfigHash>HASH</ConfigHash>
                <LastUpdate>Fri 12/04/2009 14:30:34.17</LastUpdate>
                <ContentIntrospection>
                        <IncludeParam>*</IncludeParam>
                        <ExcludeParam>SSLPort</ExcludeParam>
                <ContentIntrospection>
        <RecordElement>

<ConfigElement>
```
⎫
⎬ 310
⎭

FIG. 3

MANAGING CONFIGURATIONS OF SYSTEM MANAGEMENT AGENTS IN A DISTRIBUTED ENVIRONMENT

CROSS-REFERENCE TO RELATED APPLICATIONS

The present application is a U.S. National Stage Application under 35 U.S.C. §371 of International Application No. PCT/EP2010/065773, filed on Oct. 20, 2010, which claims the benefit of European Patent Application No. 09178609.5, filed on Dec. 10, 2009, the contents of which are incorporated herein by reference.

TECHNICAL FIELD

The present invention relates generally to system management applications, and more particularly, to managing configurations of system management agents in a distributed environment.

BACKGROUND

In system management applications, a central system management server communicates with agents, the system management client application, installed on the distributed systems which are computers or simple devices. Depending on the type of distributed system, the agent executes a set of system management functions which may differ from one system to the next. The difference may come from the type of system, its capabilities and the part it plays in this distributed environment. For instance, a distributed system, which is a mono application server, will have to report usual system monitoring information to the system manager server and some reporting in relation with the specificity of the application. One other example is when the distributed system is a simple device, such as a Personal Digital Assistant (PDA), on which the system management capabilities are limited. The agents have to execute system management functionalities on the distributed devices, such as software distribution, workload scheduling or system monitoring. An agent configuration, which comprises software elements and data, may be installed on the distributed devices for execution of these functionalities. It is usually the responsibility of the administrator to distribute from the system Management Server the software configuration to each agent, according to the system management functionalities they have to support. These manual operations are long and need to be automated.

There is thus a first need for automating downloading of configurations to the distributed systems.

Furthermore, during these download sessions, the server and the network from the central site are kept busy by the administrator for a duration which may be very long, especially in large distributed environments.

In this context, there is also a need to improve the cost and time for distribution of configuration to agents on a large number of machines.

One solution is to load raw binaries on a machine (typically done by the Information Technology (IT) department) before the machine is deployed to production. This is not; however, the best approach because the machines need to be customized as not all machines will ultimately need the same configuration knowing that they will not use the same set of system management functionalities. Providing the same maximum configuration including all the possible functionalities would be too costly in terms of foot print. Some data center machines, for example, may need to be pre-loaded with the Task Execution functionality while end user machines may need Security Compliance and Software Distribution capabilities.

To limit the problem of cost and time of the manual operations of configuration downloading to distributed data storage subsystems, a peer to peer cloning of configuration is done automatically in the network of the distributed data storage systems. Each distributed system has an operating system which is a bootstrap component already installed and the data storage subsystem configuration will add the system data necessary to store the user data. The configuration is downloaded from a peer data storage subsystem in a pull or push mode.

Applying the same type of transfer of configuration between peers of the distributed network for system management will bring the same advantage of offloading the central server and the network and the cloning operation reduces errors and increases performance during the configuration stage.

However, there is still a need for an automatic transfer of the system management agent configurations to the distributed systems in such a way that each agent receives the configuration adapted to the system management functionalities it has to support according to its capabilities.

BRIEF SUMMARY

In one embodiment of the present invention, a method for managing system management agent configurations, which comprise agent system management programs and program parameters, in a distributed environment comprising distributed systems having at least one agent installed, comprises requesting a configuration server to send a configuration record describing an agent configuration for a distributed system needing a configuration. The method further comprises receiving from the configuration server the configuration record describing the agent configuration. Additionally, the method comprises computing a current agent configuration record corresponding to a current agent configuration installed on the distributed system needing the configuration. In addition, the method comprises identifying if the current agent configuration record is different from the configuration record received from the server, and requesting the configuration server to send a list of distributed systems which are supposed to have the same agent configuration in response to the current agent configuration record being different from the configuration record received from the server. Furthermore, the method comprises contacting the distributed systems of the list and selecting one having a current configuration record which matches the configuration record received from the server. The method further comprises requesting the matching distributed system of the list to send its agent configuration. In addition, the method comprises installing, by a processor, the agent configuration on the distributed system needing the configuration upon reception of the agent configuration.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 3 illustrates an exemplary configuration record as managed by the Device configuration server in the Configuration database in accordance with an embodiment of the present invention;

DETAILED DESCRIPTION

Figure 1:
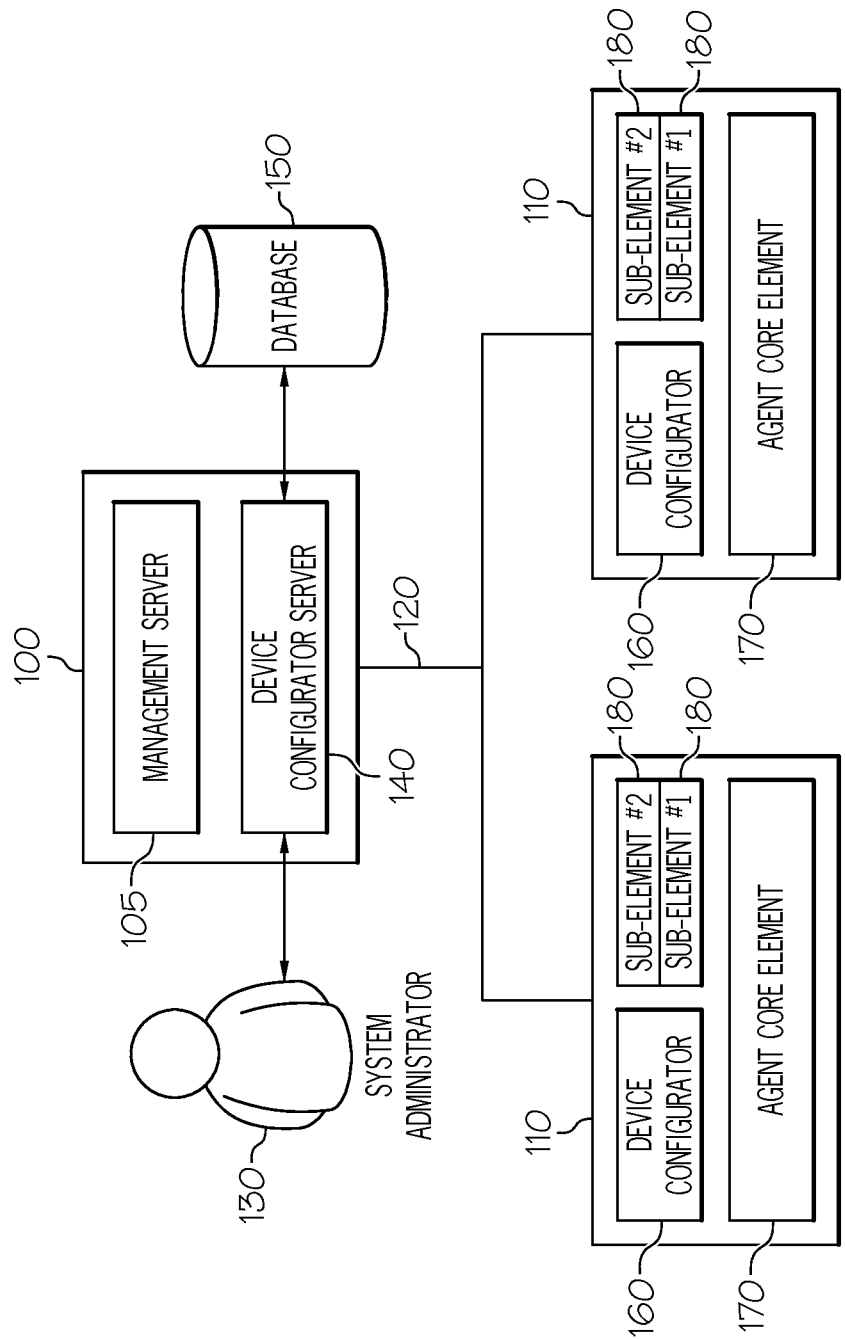
FIG. 1 illustrates the system environment in accordance with an embodiment of the present invention.

Owing to the principles of the present invention as discussed herein, the proposed solution provides a configuration management application comprising a server application running on the central system Management Server and client applications running on the distributed systems. The distributed system agents can dynamically and automatically adapt their configuration reflecting the system properties and the system management functionalities to be executed by the distributed systems. This automatic adaptation is based on a dialog between the server and the agent initiated by the agent which periodically requests an updated list of other agents which are peers in the network from which it can download the configuration. This dynamic and automatic configuration updates offloads as required the network and system Management Server because on-demand peer to peer connections are used in the network. This peer to peer transfer of configuration can be optimized if the Device Configurator client application, after having collected a valid list of peers from which the configuration can be downloaded, chooses the peer which is the closest in the network. As the "network of distributed systems" can be a heterogeneous network, a portion of the overall network can be a high speed hop while other portions may be slow speed dial up connections, and the distributed systems may be heterogeneous devices (including computers, personal digital assistant or smart phones). For optimization purpose, the Device Configurator client application may optionally choose one peer which is the closest in the same network.

Some additional advantages are bought by the present invention. A first advantage is flexibility of the solution: mixing with the solution of pre-loading of agents, a basic agent image may be pre loaded on a machine which may comprise the Core element and the Device Configurator. When the machine is deployed to production, the agent is able to configure itself reflecting the real scope of the system, by downloading from a peer the necessary Sub-Elements and only the necessary Sub-Elements and their configuration parameters. There are also two other aspects of the flexibility of the solution: when a new system is added in a specific department, the corresponding agent can be cloned starting from a referring system and automatically the new agent will adapt the configuration to the new system. Also, if the scope of the system changes in an existing distributed system environment, the corresponding agents are able to automatically change their configuration simply by referring to a different peer agent. Finally, in general, if the IT administrator wants to update the configuration of all agents belonging to a specific department, he can update the configuration on a single agent. Automatically, this update will be transferred to the others agents.

One other advantage of the solution is that the agents have a minimum footprint on the distributed systems. The Agent Core Element has a very small footprint and provides a small set of basic functionality; when added to this Agent Core Element, the Agent Sub elements provide the specialized system management functions and only the specialized system management functions which are supposed to be executed on this type of distributed system.

Referring now to the Figures in detail, FIG. 1 shows the system environment in accordance with an embodiment of the present invention. As previously known, a central system management application, the Management Server (105) operating on a computer (100), controls distributed systems (110) which may be traditional computers or communication devices, such as Personal Digital Assistant or Smart phones, over a network or heterogeneous networks (120) (e.g., wireless, Internet, GPS). The usual system management functions are, for instance, software distribution, workload scheduling or system monitoring on distributed systems. The Management Server 105 communicates with the agents which are applications executing in the distributed systems on top of the operating system under the control of the system Management Server 105. For instance, the agents may execute batch programs according to a calendar. The communication between the Management Server 105 and the agents is up down when the Management Server 105 sends configurations or changes of configurations of the agent and the agents can also contact the Management Server 105 when they have some system management data they have collected on the distributed system they have to transfer to the Management Server 105. The agents perform system management functions in relation with the system on which it is installed. The Management Server 105 can support multiple agent instances on the same distributed system which can be used if multiple infrastructures are in place. As a matter of fact, the distributed system may be organized and receive a system management support in relation with the system management functions they execute: they may be an application server for real time production mode operations, they also can be grouped by business units when they are the personal computers of a company. Generally, each agent is part of a group of agents having similar system management functionalities to accomplish for a similar distributed system. The Management Server 105 communicates to the agent to activate the system management functions which are not automatically activated by the agents and/or collect system management information. The agents can be identified by their network address or any identifier that is associated in a 1-1 relation with the machine (the distributed system computer or device) data which includes the network address.

An agent comprises some programs corresponding to system management functions, which are, for instance, in executable form or interpreted language. The agent also comprises data which are parameters to be given to the different programs, such as a calendar for automatic execution. Prior solutions may consist in uploading an agent on the distributed systems before deployment, anyhow, because the agent functions may change, an agent initially installed may need to be frequently updated. The IT administrator (130) using an interface provided by the Management Server 105, may download the agent configurations to the distributed systems. In one embodiment, this manual operation can be replaced using the new architecture as described hereunder and illustrated in FIG. 1.

A new Device Configurator server application (140) operating on the computer of the Management Server 105 provides an interface to the IT administrator. Through this interface, the IT administrator 130, manages the description of the agent configurations (the agent configuration records) and the lists of distributed systems which have the same configuration: these configuration information are stored in a configuration database (150) by the IT administrator 130. As explained below, the Device Configurator server application 140 is able to communicate with Device Configurator client applications installed on distributed systems 110. Initial agent configurations are either pre-loaded before deployment on the distributed servers 110 or initially downloaded by the IT administrator 130. Then, the agents are able to refresh their configuration automatically using the Device Configurator client component (160) installed on all the distributed systems 110: this Device Configurator client component 160 communicates in pull mode with the Device Configurator server 140 to request the list of distributed systems 110 having the same agent configuration to the Device configuration server 140. The Device Configurator client 160 is optionally able to select the distributed system 110 in the list which is the closest in the network. The Device Configurator client 160 can use a network model like the existing models used in peer to peer system, or simply by selecting an agent with similar sub-networks. The use of a network model implies calculation of parameters (like bandwidth, or lateness) for network routes and some algorithm for choosing the best agents. The simple selection of an agent with a similar sub-network consists of preferring agents belonging to similar sub-networks by using an Internet Protocol (IP) address calculation.

The Device Configurator client 160 is also able to contact the peer distributed device in the network and to clone the agent configuration. This means that the previous agent configuration is replaced by the cloned agent configuration. Finally, the Device Configurator client 160 advises the Device Configurator server 140 of this update. Going along with the cloning function provided by the Device Configurator client 160, the architecture of the agent (170, 180) comprises an agent component, the Agent Core Element (170), which provides a small set of basic agent functionalities but does not provide any specialized system management functionalities. This Agent Core Element 170 is a bootstrap component for hosting the other components of the agent architecture which are the Sub-Elements (180). The Agent Sub-Elements 180 provide specialized system management functions. There will be many Sub-Elements 180 developed and provided over time to cover the different system management disciplines. The Agent Core Element 170 which is common to all the agents has a very small footprint. The agent size depends on the number of Sub-Elements 180 which varies according to the system management functionalities supported by the agents.

Generally one Sub-Element 180 corresponds to one program and to one system management function. However, a system management function may need, over the main program of the function, some pre-requisite programs to be installed also. Consequently, such a system management function would need the installation of two sub-elements, one for the main function, one other one acting as pre-requisite program. It is noted that a pre-requisite program can be used also as a pre-requisite program or as a main program for a different system management function. This is also reflected in the structure of the Configuration Record as explained later on herein in relation to the description of FIG. 3.

It is noted that a basic agent image can be pre-loaded on a machine (Agent Core Element 170+the Device Configurator client 160). When the machine is deployed to production, the agent is able to configure itself reflecting the real scope of the system downloading from a peer the necessary subagents and configuration parameters. The Sub-Element structure may allow a progressive upgrade of the agent size and an easy update of the agent configuration. A new distributed system may start with an agent coming from a different system and adapt itself automatically to install the agent configuration on this new system. When the IT administrator 130 wants to update the configuration of all agents belonging to a specific group of distributed devices, it can update the configuration on a single agent, and automatically this update will be performed by the others agents of the group. It is noted that agents for distributed systems belonging to a same company business unit should have the same configuration and the agents are slightly different in distributed systems belonging to other business units.

Figure 2:
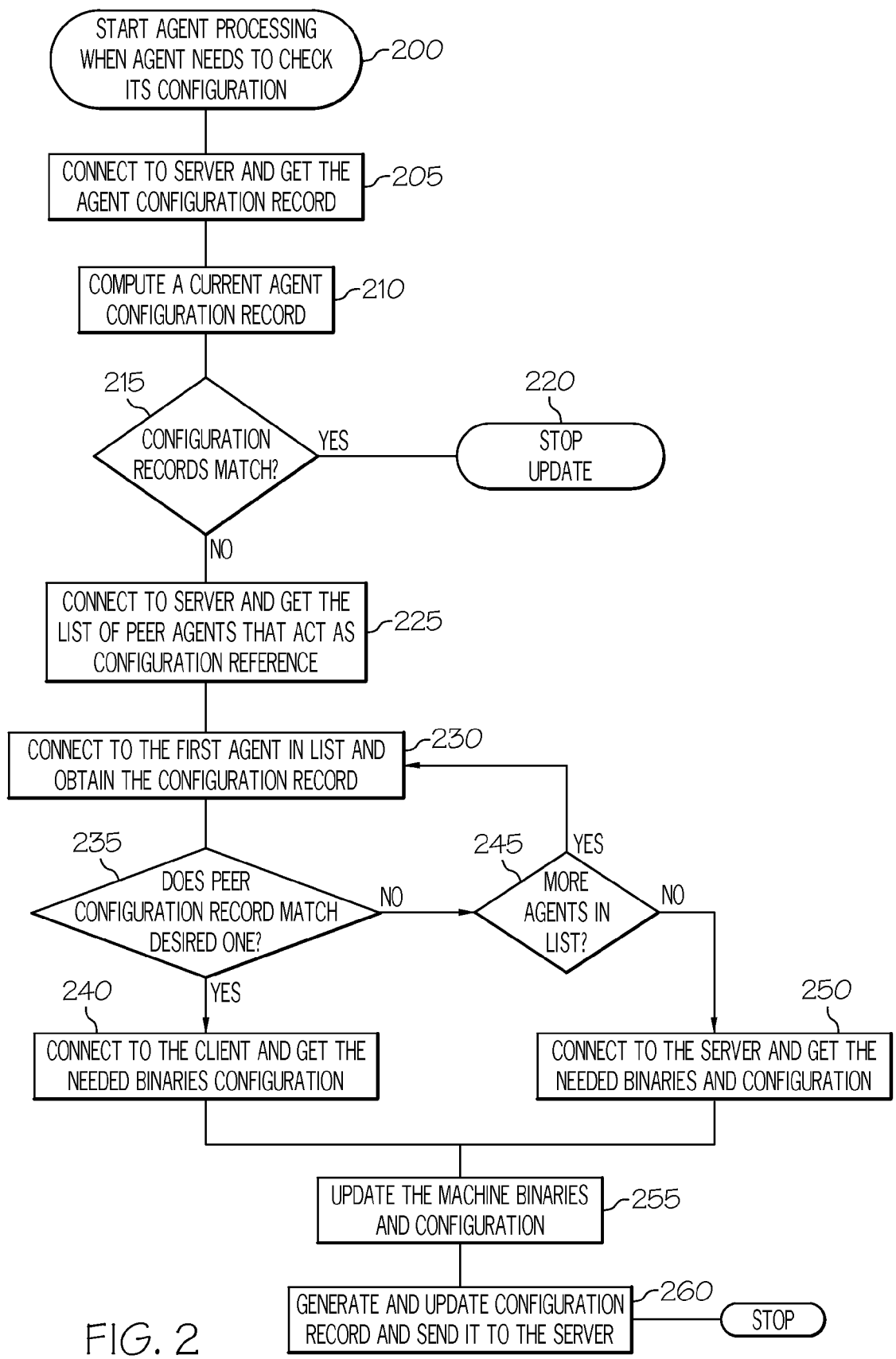
FIG. 2 is a flowchart of a method for automatic configuration of a system management agent in accordance with an embodiment of the present invention.

FIG. 2 is a flowchart of a method for automatic configuration of a system management agent according to an embodiment of the present invention. Referring to FIG. 2, in conjunction with FIG. 1, the flowchart describes the steps of the method executed by the Agent Device Configurator component which is the Device Configurator client application 160 installed on the distributed system 110. More specifically, the flowchart illustrates the dialog between the Device Configurator component of a distributed device, the Device Configurator server 140 and the Device Configurator component 160 of peer distributed systems 110. The process starts (200) when an agent needs to check its configuration. This process can be either periodically activated by the Device Configurator component 160, or automatically activated at initialization of the distributed system 110, or initialized by a command sent from the Device Configurator server application 140 either automatically or upon request of the IT administrator 130. It is noted also that the minimum agent configuration to activate the process on the distributed system comprises the Agent Core Element 170 and the Device Configurator client application 160 installed.

The Device Configurator client 160 of a distributed system 110 connects (205) to the Device Configurator server 140 to get the agent configuration information corresponding to an agent identifier of the requesting agent. It is noted that the Device Configurator client 160 for connecting to the Device Configurator server 140 may use the services of the Agent Core Element 170 installed on the same distributed system 110. Any other possibility can be considered such as having a Device Configurator client 160 able to communicate by itself with the Device Configurator Server 140 but this choice is not really significant for the principle of the solution. As explained earlier in the document, the configuration information is stored in the configuration database 150 and they have been entered by the IT administrator 130. Agent configuration information stored in the database describes the programs to be installed to execute the system management functionalities and the parameters used for customizing such programs. The first information obtained with the agent identifier in step 205 is a series of Agent Configuration Records such as described later herein in relation with the description of FIG. 3. Usually one record, but sometimes more than one record, gives a way to identify one application corresponding to one system management function which must be executed by the agent and which corresponds also to at least one program or Sub-Element 180 to be installed on the distributed system 110. By reading the programs listed in the first configuration information, the Device Configurator client 160 computes its current Agent configuration record (210) by using the Sub-Element 180 programs currently installed and executed locally. In step 215, the Device Configuration Client 160 checks, by using the hash key characterizing the corresponding system management function, if the agent has already the same configuration installed by comparing, in one embodiment, the computed hash key with the hash key of its current configuration record. If there is a match (answer Yes to test 215), the configuration has no need to be refreshed and the process is stopped (220). This checking process may be performed periodically by the Device Configurator clients 160 to maintain the agent configuration in line with the IT administrator 130 planning. If the downloaded Agent configuration record does not match the configuration records (answer No to test 215), this means the agent configuration needs to be refreshed. It is noted that when there is a match between the current and downloaded Agent configuration record, this means that the correct programs are already installed and that these programs have been correctly customized with the correct parameters. Usually, an agent belongs to a group of agents with the same configuration. One other group of agents may differ not by the type of program installed but by their customization because, for instance, they are not running on the same computer.

When the configuration of the agent is not up-to-date because the Agent configuration record does not match with the current one, the Device Configurator client 160 connects to the Device Configurator server (225) to get the list of peer agents acting as a reference for their configuration. This may mean that the corresponding distributed systems 110 are in a same group, for instance, personal computers of a same company business unit. As stated before, the list of peers is stored in the configuration database by the Device Configurator server 140. In one embodiment, the list of peer agents is given for the entire configuration. A possible variation is if the list of peer agents is given on a per application basis. The next step is for the Device Configurator client 160 to connect to the first agent in the list (230) to obtain its current Agent configuration record still using the hash keys. In step 235, a determination is made as to whether the peer configuration record matches the desired one. If there is a match between the Agent configuration records (answer Yes to test 235), the Device configuration records get the needed agent configuration (240) and update the agent with this configuration by installing as many agent Sub-Elements 180 as the number of programs necessary for the system management application which are not yet installed and by customizing all the programs necessary for the system management application.

It may happen that no distributed system 110 in the list contains the agent configuration because they do not have the latest up-to-date configuration. That is why before getting the agent configuration from one peer system of the list, the Device Configurator has to check if the referring peer configuration is reliable. In step 245, a determination is made as to whether there are more agents in the list. In the case where no peer of the list has the up-to-date configuration (answer No to test 245), in step 250, the up-to-date configuration is requested by the Device Configurator client 160 to the Device Configurator server 140 which not only stores in the configuration database 150 the description of all the agent configurations but also this server can access all the agent configuration files. This is why the Device Configurator server 140 is installed on the same computer as the System management server (the Management Server 105) which could need to access these agent configuration files as well.

If, however, the answer to test 245 is Yes, then the Device Configurator client 160 connects to the first agent in the list (230) to obtain its current Agent configuration record still using the hash keys.

Upon executing steps 240, 250, new binaries are installed with the correct customization as described in the Agent configuration record. However, in one embodiment, this update (255) is done by cloning the customized binaries from the peer agent. As previously known, the cloning allows reducing errors and reducing performance during the installation. In one embodiment both Agent Core Elements 170 and Sub-Elements 180 are cloned; the cloning is done by downloading the individual parts of data from one or more agents in the list; parts may include configuration files, program files (executable, script, etc.).

In step 260, the Device Configurator client 160 updates the Agent configuration record and sends it to the Device configuration server 140 as being the current Agent configuration record for this agent; the Device Configurator server 140 stores this information in the configuration database 150.

It is noted that the Device Configurator client applications 160 running in the distributed systems 110 may use the communication basic functions of the Agent Core Element 170 to communicate with the Device Configurator Server 140 or with the peer distributed system Device Configurator Client applications 160.

In some implementations, the method of FIG. 2 may include other and/or additional steps that, for clarity, are not depicted. Further, in some implementations, the method of FIG. 2 may be executed in a different order presented and that the order presented in the discussion of FIG. 2 is illustrative. Additionally, in some implementations, certain steps in the method of FIG. 2 may be executed in a substantially simultaneous manner or may be omitted.

Referring now to FIG. 3, in conjunction with FIGS. 1 and 2, FIG. 3 shows one example of an Agent Configuration Record as managed by the Device Configuration Server 140 in the Configuration database 150 according to one embodiment of the present invention.

The Agent Configuration Record is the condensed representation of the software configuration, in terms of programs and program parameters, for executing one system management function. A system management function executed by one agent requires one corresponding program to be installed and to be well customized with the correct parameters. Also, it may happen that one other pre-requisite program is necessary to be installed and customized. Such a case is when the agent needs to use one other pre-requisite program already installed. However, the other pre-requisite program already installed may need to have a different customization. In this case, the new parameters used for this customization have to be described in the Configuration record. In these two later cases, one additional configuration record relating to the second pre-requisite program will be necessary for the installation of the agent system management function.

It is noted that, once installed, the programs corresponding to each Configuration Record for the Sub-Elements 180 are as described in relation with FIG. 1.

The Agent configuration Records are under the control of the Device Configurator server 140. They are stored in the Configuration database 150 by the Device Configurator server 140 upon an action from the IT administrator 130. In the database 150, a meta-language is used to identify an Agent configuration Record.

A Configuration Record describing the configuration of a given system management function comprises the following statement:
<Application>ApplicationName</Application>
in which the Application name is the program name.

In the rest of the Configuration Record is described the at least one set of parameters for the program customization, under the statement of <ConfigElement>. This ConfigElement statement (300) may comprise a parameter file name in the statement <INIFile>. The set of parameters is further described by the following statement, <RecordElement> giving more information on the parameter file, for instance, the file Size (statement <FileSize>, the last update date with the statement <LastUpdate> and the <ContentIntrospection> statement modifying the parameter list by citing which parameter(s) to exclude in the parameter file and/or which parameter(s) to include. Finally, a ConfigElement statement includes a hash key computed on the basis of the content of the Record Element which is used by the Device Configuration client 160 to quickly compare two configuration elements in two different configuration records (215, 235). Using the hash key, the Device Configurator client 160 can check if the application is installed and configured in the same way described in the configuration record. Each configuration element includes a statement <ConfigHash> providing the HASH value. Any known type of Hash key computation algorithm can be used.

One other set of parameters (310) may be also directly defined by a set of parameters and its value under the statement
<ConfigParam name+value=>
as illustrated also in FIG. 3.

Consequently, a configuration record will therefore contain:
APPNAME . . . Element . . . 142545 . . .
where 142545 is the hash value of a properly configured Application on a given system. The Device Configurator client application 160 is able to interpret, generate and compute configuration records and check if the hash key received is the same as the hash received in the configuration record received from the Device Configuration Server 140.

In one embodiment, the method of the present invention is implemented as computer programs operating on the computer 100 of the system manager server and the distributed systems 110 rather than by hardware logic. A description of the hardware configuration of computer 100, distributed systems 110 is provided further below in connection with FIG. 5. It is noted that the System Management Server 105 and the Device Configurator server 140 may be installed on the same computer or installed on different computers.

Figure 4:
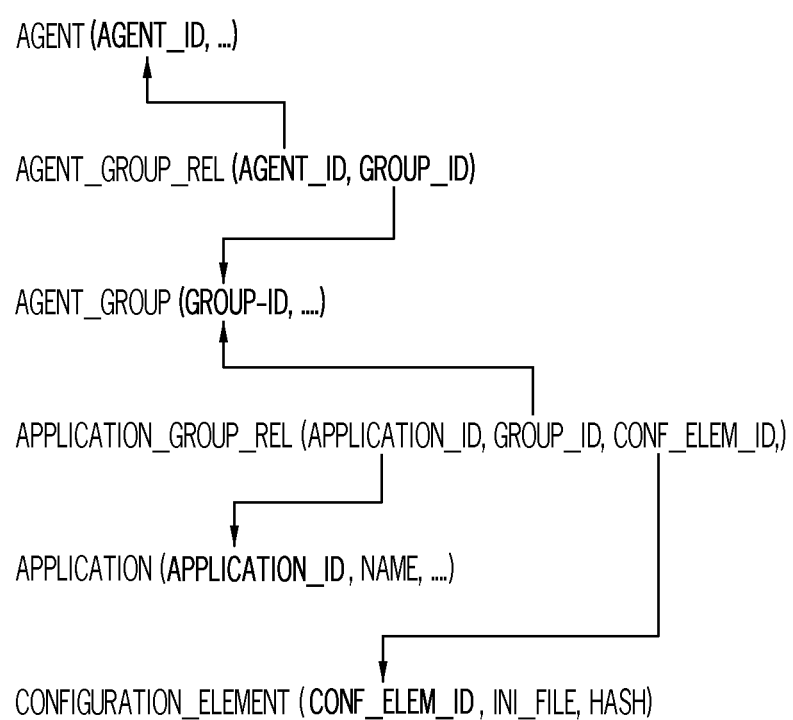
FIG. 4 illustrates an exemplary configuration database record database managed by the Device configuration server in accordance with an embodiment of the present invention.

FIG. 4 shows one example of configuration database record database 150 managed by the Device configuration server 140 (FIG. 1) according to one embodiment of the present invention. Referring to FIG. 4, in conjunction with FIGS. 1-3, the configuration database 150 contains metadata which are necessary to retrieve an agent configuration: all the agents with their related data. These metadata are updated by the IT administrator 130 at server side (or can be automatically created by program) and are used by the Device Configurator client-server application.

The AGENT metadata contains the list of agents of the distributed environment known from the Device Configurator application server 140. The agents are identified (AGENT_ID) by their network address or any identifier that is associated in a 1-1 relation with the machine (the distributed system computer or device) data which includes the network address.

Similarly, the AGENT_GROUP metadata contains the list of groups. The agents are grouped according to the agent and the distributed system organization controlled by the IT administrator 130: a group may be a business unit of a company.

The APPLICATION metadata contains the list of system management applications that the agents may have to execute on the distributed systems 110. The APPLICATION is part of the Agent Configurator record as previously described herein in relation with the description of FIG. 3.

The CONFIGURATION_ELEMENT metadata contains information allowing to retrieve the configuration information (program, program parameters) attached to a specific application. The CONFIGURATION_ELEMENT is part of the Agent Configurator record as previously described herein in relation with the description of FIG. 3.

AGENT_GROUP_REL contains the relation between an agent and its group. It teaches which agent belongs to which group.

APPLICATION_GROUP_REL contains the relation between Application and Groups as well as the related Configuration Element with the current configuration (which application is installed on which group and the reference to the current application configuration).

When a configuration record for a specific agent is requested by the Device Configurator client 160, the Device Configurator server 140 searches for the related Groups. For each application installed on those Groups, a list of configuration elements is returned.

Figure 5:
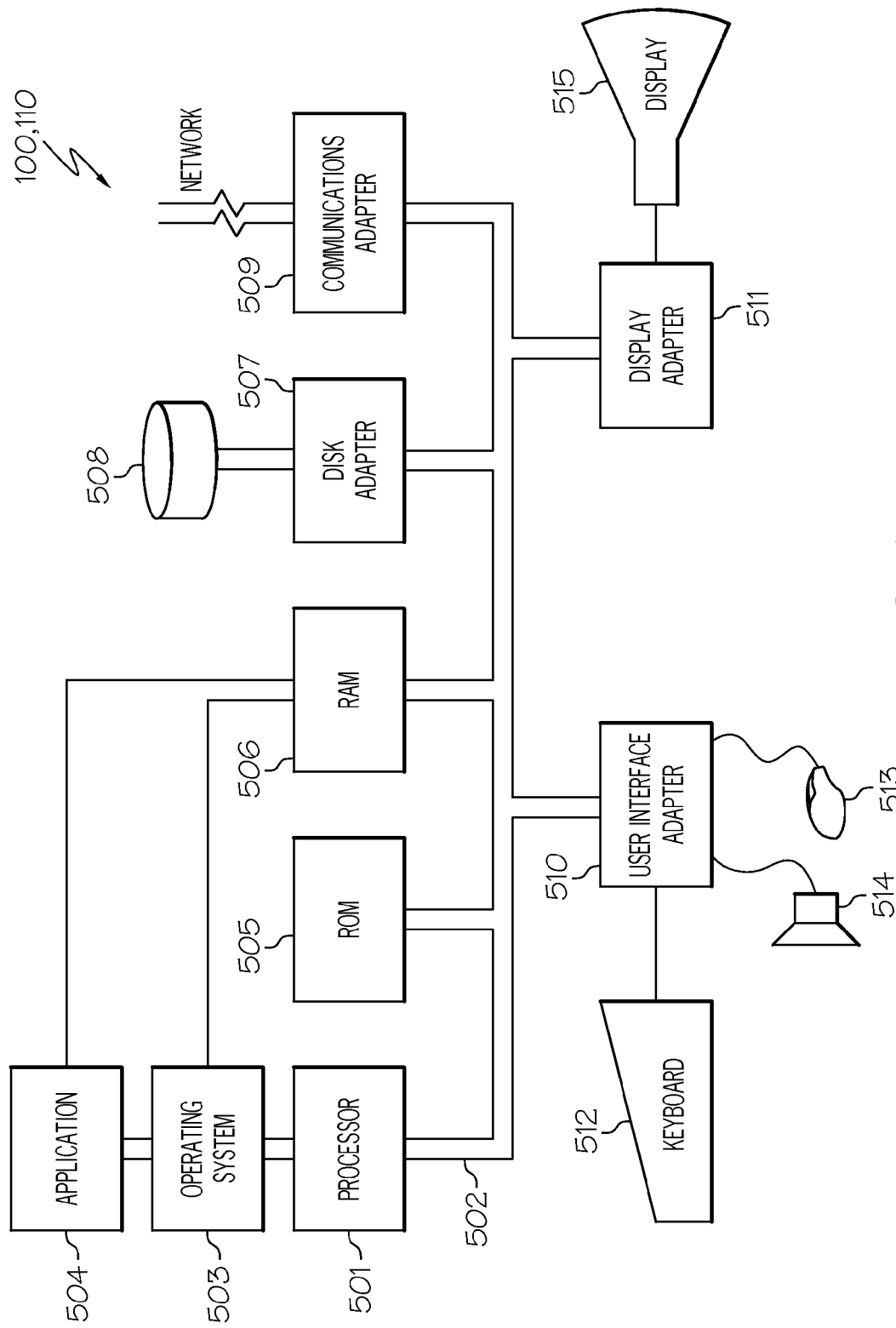
FIG. 5 depicts an embodiment of a hardware configuration of a computer and a distributed system which is representative of a hardware environment for practicing the present invention.

FIG. 5 depicts an embodiment of a hardware configuration of a computer 100, distributed systems 110 which is representative of a hardware environment for practicing the present invention. Referring to FIG. 5, computer 100, distributed systems 110 have a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504. Application 504 may include, for example, an application for managing system management agent configurations as discussed above.

Referring again to FIG. 5, read-only memory ("ROM") 505 may be coupled to system bus 502 and include a basic input/output system ("BIOS") that controls certain basic functions of computer 100, distributed systems 110. Random access memory ("RAM") 506 and disk adapter 507 may also be coupled to system bus 502. It should be noted that software components including operating system 503 and application 504 may be loaded into RAM 506, which may be computer's 100, distributed systems' 110 main memory for execution. Disk adapter 507 may be an integrated drive electronics ("IDE") adapter that communicates with a disk unit 508, e.g., disk drive.

Computer 100, distributed systems 110 may further include a communications adapter 509 coupled to bus 502. Communications adapter 509 may interconnect bus 502 with an outside network thereby allowing computer 100, distributed systems 110 to communicate with other similar devices.

I/O devices may also be connected to computer 100, distributed systems 110 via a user interface adapter 510 and a display adapter 511. Keyboard 512, mouse 513 and speaker 514 may all be interconnected to bus 502 through user interface adapter 510. A display monitor 515 may be connected to system bus 502 by display adapter 511. In this manner, a user is capable of inputting to computer 100, distributed systems 110 through keyboard 512 or mouse 513 and receiving output from computer 100, distributed systems 110 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing system management agent configurations, which comprise agent system management programs and program parameters, in a distributed environment comprising distributed systems having at least one agent installed, the method comprising:

requesting a configuration server to send a configuration record describing an agent configuration for a distributed system needing a configuration, wherein said configuration record is a representation of a software configuration in terms of programs and program parameters for executing a system management function;

receiving from the configuration server the configuration record describing the agent configuration;

computing a current agent configuration record corresponding to a current agent configuration installed on the distributed system needing the configuration;

identifying if the current agent configuration record is different from the configuration record received from the server, and requesting the configuration server to send a list of distributed systems which are supposed to have the same agent configuration in response to the current agent configuration record being different from the configuration record received from the server;

contacting the distributed systems of the list and selecting one having a current configuration record which matches the configuration record received from the server;

requesting the matching distributed system of the list to send its agent configuration; and upon reception of the agent configuration, installing, by a processor, the agent configuration on the distributed system needing the configuration.

2. The method as recited in claim 1 further comprising:
computing a configuration record of the just installed agent and sending the configuration record to the configuration server.

3. The method as recited in claim 1, wherein the installing includes the distributed system needing the configuration cloning the entire agent configuration from the matching distributed system.

4. The method as recited in claim 1, wherein agent configuration records comprise a hash key computed from the agent configuration, and wherein identifying of a matching configuration with the current configuration record or with the configuration record of the distributed system of the list comprises comparing the hash key of the configuration records, and, if the keys are the same, the configuration records are the same.

5. The method as recited in claim 1, wherein the configuration server stores all configuration records for all agents and for all groups of agents, each agent of a group of agents having the same agent configuration records, wherein a system management administrator updates a database through an interface of the configuration server.

6. The method as recited in claim 1, wherein the selecting of the one distributed system having the current configuration record which matches the configuration record received from the server further comprises:
selecting among all the distributed systems having the current configuration record which matches the configuration record received from the server the distributed system which is geographically the closest in a distributed environment network.

7. The method as recited in claim 1 further comprising:
requesting a configuration management server to download the agent configuration in response to having a configuration client not finding any distributed system from the list having the current configuration record which matches the configuration record received from the server.

8. A computer program product embodied in a non-transitory computer readable storage medium for managing system management agent configurations, which comprise agent system management programs and program parameters, in a distributed environment comprising distributed systems having at least one agent installed, the computer program product comprising the programming instructions for:

requesting a configuration server to send a configuration record describing an agent configuration for a distributed system needing a configuration, wherein said configuration record is a representation of a software configuration in terms of programs and program parameters for executing a system management function;

receiving from the configuration server the configuration record describing the agent configuration;

computing a current agent configuration record corresponding to a current agent configuration installed on the distributed system needing the configuration;

identifying if the current agent configuration record is different from the configuration record received from the server, and requesting the configuration server to send a list of distributed systems which are supposed to have the same agent configuration in response to the current agent configuration record being different from the configuration record received from the server;

contacting the distributed systems of the list and selecting one having a current configuration record which matches the configuration record received from the server;

requesting the matching distributed system of the list to send its agent configuration; and upon reception of the agent configuration, installing the agent configuration on the distributed system needing the configuration.

9. The computer program product as recited in claim 8 further comprising the programming instructions for:
computing a configuration record of the just installed agent and sending the configuration record to the configuration server.

10. The computer program product as recited in claim 8, wherein the programming instructions for installing includes the distributed system needing the configuration cloning the entire agent configuration from the matching distributed system.

11. The computer program product as recited in claim 8, wherein agent configuration records comprise a hash key computed from the agent configuration, and wherein identifying of a matching configuration with the current configuration record or with the configuration record of the distributed system of the list comprises the programming instructions for comparing the hash key of the configuration records, and, if the keys are the same, the configuration records are the same.

12. The computer program product as recited in claim 8, wherein the configuration server stores all configuration records for all agents and for all groups of agents, each agent of a group of agents having the same agent configuration records, wherein a system management administrator updates a database through an interface of the configuration server.

13. The computer program product as recited in claim 8, wherein the programming instructions for selecting of the one distributed system having the current configuration record which matches the configuration record received from the server further comprises the programming instructions for:
selecting among all the distributed systems having the current configuration record which matches the configuration record received from the server the distributed system which is geographically the closest in a distributed environment network.

14. The computer program product as recited in claim 8 further comprising the programming instructions for:
requesting a configuration management server to download the agent configuration in response to having a configuration client not finding any distributed system from the list having the current configuration record which matches the configuration record received from the server.

15. A system, comprising:
a memory unit for storing a computer program for managing system management agent configurations, which comprise agent system management programs and program parameters, in a distributed environment comprising distributed systems having at least one agent installed; and
a processor coupled to the memory unit, wherein the processor, responsive to the computer program, comprises:
   circuitry for requesting a configuration server to send a configuration record describing an agent configuration for a distributed system needing a configuration, wherein said configuration record is a condensed representation of a software configuration in terms of programs and program parameters for executing a system management function;
   circuitry for receiving from the configuration server the configuration record describing the agent configuration;
   circuitry for computing a current agent configuration record corresponding to a current agent configuration installed on the distributed system needing the configuration;
   circuitry for identifying if the current agent configuration record is different from the configuration record received from the server, and requesting the configuration server to send a list of distributed systems which are supposed to have the same agent configuration in response to the current agent configuration record being different from the configuration record received from the server;
   circuitry for contacting the distributed systems of the list and selecting one having a current configuration record which matches the configuration record received from the server;
   circuitry for requesting the matching distributed system of the list to send its agent configuration; and
   circuitry for installing the agent configuration on the distributed system needing the configuration upon reception of the agent configuration.

16. The system as recited in claim 15, wherein the processor further comprises:
circuitry for computing a configuration record of the just installed agent and sending the configuration record to the configuration server.

17. The system as recited in claim 15, wherein the circuitry for installing includes the distributed system needing the configuration cloning the entire agent configuration from the matching distributed system.

18. The system as recited in claim 15, wherein agent configuration records comprise a hash key computed from the agent configuration, and wherein identifying of a matching configuration with the current configuration record or with the configuration record of the distributed system of the list comprises the circuitry for comparing the hash key of the configuration records, and, if the keys are the same, the configuration records are the same.

19. The system as recited in claim 15, wherein the configuration server stores all configuration records for all agents and for all groups of agents, each agent of a group of agents having the same agent configuration records, wherein a system management administrator updates a database through an interface of the configuration server.

20. The system as recited in claim 15, wherein the circuitry for selecting of the one distributed system having the current configuration record which matches the configuration record received from the server further comprises:
circuitry for selecting among all the distributed systems having the current configuration record which matches the configuration record received from the server the distributed system which is geographically the closest in a distributed environment network.

21. The system as recited in claim 15, wherein the processor further comprises:
circuitry for requesting a configuration management server to download the agent configuration in response to having a configuration client not finding any distributed system from the list having the current configuration record which matches the configuration record received from the server.

* * * * *